US010732983B1

(12) United States Patent
van Adelsberg et al.

(10) Patent No.: US 10,732,983 B1
(45) Date of Patent: Aug. 4, 2020

(54) SYSTEMS AND METHODS OF PARALLEL AND DISTRIBUTED PROCESSING OF DATASETS FOR MODEL APPROXIMATION

(71) Applicant: Capital One Services, LLC, McLean, VA (US)

(72) Inventors: Matthew van Adelsberg, McLean, VA (US); Rohit Joshi, McLean, VA (US); Siqi Wang, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/401,748

(22) Filed: May 2, 2019

(51) Int. Cl.
*G06N 7/00* (2006.01)
*G06F 9/38* (2018.01)
*G06F 9/26* (2006.01)
*G06F 9/48* (2006.01)

(52) U.S. Cl.
CPC ............ *G06F 9/3887* (2013.01); *G06F 9/268* (2013.01); *G06F 9/4806* (2013.01); *G06N 7/005* (2013.01)

(58) Field of Classification Search
CPC .................................................... G06F 9/3887
See application file for complete search history.

(56) References Cited

U.S. PATENT DOCUMENTS

2016/0321777 A1* 11/2016 Jin ......................... G06F 9/5016
2017/0111234 A1* 4/2017 Kadav .................... H04L 41/16
2018/0025286 A1* 1/2018 Gorelik .................. G06N 20/00
706/12
2018/0240011 A1* 8/2018 Tan .......................... G06F 17/18
2018/0253818 A1* 9/2018 John ...................... G06F 9/5061
2019/0251279 A1* 8/2019 Emberson ............. G06F 16/122
2019/0354833 A1* 11/2019 Vishnu ..................... G06N 3/08
2020/0042362 A1* 2/2020 Cui ........................ G06F 9/505

OTHER PUBLICATIONS

Scalable Training of Deep Learning Machines by Incremental Block Training With Intra-Block Parallel Optimization and Blockwise Model-Update Filtering, Kai Chen and Quiang Huo, 978-1-4799-9988-0/16/$31.00 ©2016 IEEE, pp. 5880-5884 (Year: 2016).*

(Continued)

*Primary Examiner* — Hal Schnee
(74) *Attorney, Agent, or Firm* — Troutman Sanders LLP; Christopher J. Forstner; Brennan M. Carmody

(57) ABSTRACT

A system including: at least one processor; and at least one memory having stored thereon computer program code that, when executed by the at least one processor, controls the system to: receive a data model identification and a dataset; in response to determining that the data model does not contain a hierarchical structure, perform expectation propagation on the dataset to approximate the data model with a hierarchical structure; divide the dataset into a plurality of channels; for each of the plurality of channels: divide the data into a plurality of microbatches; process each microbatch of the plurality of microbatches through parallel iterators; and process the output of the parallel iterators through single-instruction multiple-data (SIMD) layers; and asynchronously merge results of the SIMD layers.

15 Claims, 8 Drawing Sheets

(56) References Cited

OTHER PUBLICATIONS

"Communication Quantization for Data-parallel Training of Deep Neural Networks," Nikoli Dryden et al., 2016 2nd Workshop on Machine Learning in HPC Environments, 978-1-5090-3882-4/16$31.00 © 2016 IEEE, DOI 10.1109/MLHPC.2016.4 (Year: 2016).*
"AdaComp: Adaptive Residual Gradient Compression for Data-Parallel Distributed Training," Chia-Yu Chen et al., The Thirty-Second AAAI Conference on Artificial Intelligence (AAAI-18), Copyright c 2018, Association for the Advancement of Artificial Intelligence (www.aaai.org) (Year: 2018).*
Rinard, Martin C. "Unsynchronized techniques for approximate parallel computing." RACES Workshop. 2012 (Year: 2012).*
GE, H. et al., "Distributed Inference for Dirichlet Process Mixture Models," Proceedings of the 32nd International Conference on Machine Learning; JMLR: W&CP vol. 37, 2015.
Gelman, A. et al., "Expectation propagation as a way of life: A framework for Bayesian inference on partitioned data," Mar. 7, 2017.
Vehtari, A. et al., "Expectation propagation as a way of life: A framework for Bayesian inference on partitioned data," Feb. 28, 2018.
Zhai, K. et al., "Mr. LDA: A Flexible Large Scale Topic Modeling Package using Veriational Inference in MapReduce," ACM International Conference on World Wide Web, Apr. 16-20, 2012.
Hasenclever, L. et al., "Distributed Bayesian learning with Stochastic Natural Gradient Expectation Propagation and the Posterior Server," Journal of Machine Learning Research 18, pp. 1-37, Aug. 2017.

* cited by examiner

US 10,732,983 B1

SYSTEMS AND METHODS OF PARALLEL AND DISTRIBUTED PROCESSING OF DATASETS FOR MODEL APPROXIMATION

FIELD

The disclosed technology generally relates to parallel and distributed processing, and, more particularly, to processing large data models utilizing parallel and distributed processing.

BACKGROUND

Machine learning and artificial intelligence are increasingly important tools for automating and improving processes. For example, such tools may be used for fraud detection, operations monitoring, natural language processing and interactions, and environmental analysis. Many of these cases requires fitting (e.g., training) increasingly sophisticated models to large datasets containing millions of data units, each with hundreds of features (e.g., "big data"). However, by relying on large datasets, model modification and data updates require time and processor intensive re-training.

In the related art, certain libraries (e.g., MLib for Apache Spark or H2O ML platform) effectively implement a limited number of models on large datasets. However, such libraries only support a limited range of model types, which are not calibrated to all problems. Therefore, if such libraries are used outside of this limited range, they may provide false results, which can cause compound errors. For many problems, richer model structures are required to properly fit particular datasets and provide valuable analysis. Currently, custom models may be developed for particular use cases, but such customization requires extensive fitting to the dataset, which is a very expensive process (in terms of time and processor power) and not easily parallelizable within distributed computing.

Accordingly, certain there is a need for improved systems and methods to process a wide range of customized models at scale. Certain aspects of the present disclosure provide a distributed computing framework for executing arbitrary models at "big data" scale. Moreover, some aspects of the present disclosure provide tools for building generative models (e.g., Bayesian generative models) flexibly.

BRIEF SUMMARY

Disclosed embodiments provide systems and methods to process large data models utilizing parallel and distributed processing.

According to some embodiments, there is provided a system including: at least one processor; and at least one memory having stored thereon computer program code that, when executed by the at least one processor, controls the system to: receive a data model identification and a dataset; in response to determining that the data model does not contain a hierarchical structure, perform expectation propagation on the dataset to approximate the data model with a hierarchical structure; divide the dataset into a plurality of channels; for each of the plurality of channels: divide the data into a plurality of microbatches; process each microbatch of the plurality of microbatches through parallel iterators; and process the output of the parallel iterators through single-instruction multiple-data (SIMD) layers; and asynchronously merge results of the SIMD layers.

Asynchronously merging the results of the SIMD layers may be performed using a lossy transfer protocol.

The computer program code, when executed by the at least one processor, may further control the system to: update, based on the merged results, model parameters of the data model; and repeat, for each of the plurality of channels and based on the updated model parameters, dividing the data into a plurality of microbatches, processing each microbatch through parallel iterators, and processing the output of the parallel iterators through SIMD layers.

The computer program code, when executed by the at least one processor, may further control the system to transmit, amongst the plurality of microbatches, respective microbatch states.

Transmitting the respective microbatch states may be performed using a lossy data standard.

The data model may include a Bayesian data model, and approximating the data model with a hierarchical structure comprises performing a Dirichlet process on the dataset.

The data model identification may include an indication of a selection of a first data model from among a plurality of known data models.

The data model identification may include receiving an indication of a data model definition.

The computer program code, when executed by the at least one processor, may further control the system to determine that the data model does not contain a hierarchical structure by analyzing the data model definition.

According to some embodiments, there is provided a system including: at least one processor; and at least one memory having stored thereon computer program code that, when executed by the at least one processor, controls the system to: receive a data model identification and a dataset; assigning subsets of the dataset to respective nodes of a plurality of nodes; for each of the plurality of nodes: divide the data subset into a plurality of channels; and for each of the plurality of channels: further divide the data into a plurality of microbatches; process each microbatch of the plurality of microbatches through parallel iterators; and process the output of the parallel iterators through single-instruction multiple-data (SIMD) layers; and asynchronously merging results of the SIMD layers; and merging the results for the plurality of nodes.

Each node may identify the assigned subset of data based on a master configuration, and directly accesses the assigned subset of data.

The nodes of the plurality of nodes may not pass data between themselves.

Merging the results for the plurality of nodes may be performed using a lossy transfer protocol.

The computer program code, when executed by the at least one processor, may further control the system to: update, based on the merged results of the plurality of nodes, model parameters of the data model; and repeat, for each of the plurality of nodes and for each of the plurality of channels and based on the updated model parameters, dividing the data into a plurality of microbatches, processing each microbatch through parallel iterators, and processing the output of the parallel iterators through respective SIMD layers.

The computer program code, when executed by the at least one processor, may further control the system to: for each node of the plurality of nodes, transmit, amongst the plurality of microbatches corresponding to the node, respective microbatch states.

Transmitting the respective microbatch states may be performed using a lossy data standard.

The data model may include a Bayesian data model, and modifying the dataset comprises performing a Dirichlet process on the dataset.

The computer program code, when executed by the at least one processor, may further control the system to, in response to determining that the data model does not contain a hierarchical structure, perform expectation propagation on the dataset to approximate the data model with a hierarchical structure.

According to some embodiments, there is provided a method including: receiving, by a computing device, a data model identification and a dataset; in response to determining that the data model does not contain a hierarchical structure, performing, by the computing device, expectation propagation on the dataset, modifying the dataset to have a hierarchical structure; dividing, by the computing device, the dataset into a plurality of channels; for each of the plurality of channels: dividing, by at least one modeling server, the data into a plurality of microbatches; processing, by the at least one modeling server, each microbatch of the plurality of microbatches through parallel iterators; and processing, by the at least one modeling server, the output of the parallel iterators through single-instruction multiple-data (SIMD) layers; asynchronously merging, by the at least one modeling server, results of the SIMD layers; updating, by the at least one modeling server and based on the merged results, model parameters of the data model; and repeating, for each of the plurality of channels and based on the updated model parameters, dividing the data into a plurality of microbatches, processing each microbatch through parallel iterators, and processing the output of the parallel iterators.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is directed to methods and systems for transforming sequence diagrams into architectural diagrams. The present disclosure also relates to generating master architecture diagrams from a plurality of sequence diagrams. Moreover, the present disclosure all relates to providing enhanced functionality to the architecture diagrams by transforming the sequence diagram elements and linking transformed elements within the architectural diagram.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
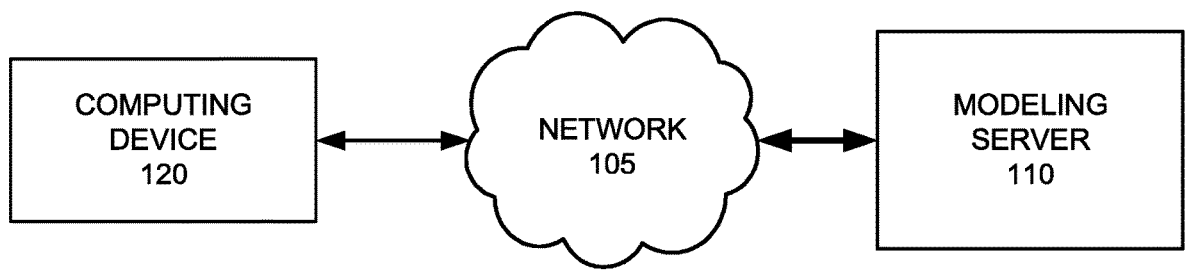
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system environment 100 may include a modeling server 110 in communication with a computing device 120 via network 105. In some embodiments, modeling server 110 may also be in communication with various databases (e.g., model database or dataset database). Computing device 120 may be a mobile computing device (e.g., a smart phone, tablet computer, smart wearable device, portable laptop computer, voice command device, wearable augmented reality device, or other mobile computing device) or a stationary device (e.g., desktop computer).

The modeling server 110 may train data models using datasets. In some embodiments, modeling server 110 may receive a data model and dataset from computing device 120. For example, modeling server 110 may provide an interface for receiving an indication of a data model (e.g., data model terms) and an indication of a location of a dataset (e.g., a dataset URL). In some situations, modeling server 110 may provide an interface for developing and modifying data models. Modeling server 110 may analyze the data model, divide the dataset into a plurality of channels, and process the data in accordance with the models in microbatches and parallel iterators, for example, as described below in greater detail. In some cases, modeling server 110 may perform expectation propagation on the dataset in order to approximate the data model with a hierarchical structure that allows separation of the dataset into microbatches (e.g., enabling massively-parallel analysis of the data model). Modeling server 110 may provide modeling as a server to computing device 120. One of ordinary skill will recognize that modeling server 110 may be embodied by a plurality of logically and/or physically separate machines (e.g., servers). In some cases, modeling server 110 may implement parallelized versions of the Dirichlet Process and/or the Buffet Process utilizing microbatches, parallel iterators, and/or SIMD layers.

In some cases, the data model may be thought of as a non-determinative function. The data model may be sampled such that the samples are representative of the probability distribution of the model parameters given a dataset. By repeated massively-parallel analysis of the samples, model parameters of the dataset may be estimated to a sufficient degree.

Computing device 120 may access modeling server 110 and provide modeling server 110 with a data model and dataset. In some cases, computing device 120 may provide user inputs to modeling server 110 to develop a customized data model. According to certain embodiments, computing device 120 provides estimated model parameters and/or model processing parameters to modeling server 110. One of ordinary skill will recognize that the user inputs may be programmable in various programming languages such as, as non-limiting examples, Java, Python, Scala, R, and/or SQL.

Network 105 may be of any suitable type, including individual connections via the internet such as cellular or Wi-Fi networks. In some embodiments, network 105 may connect terminals using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
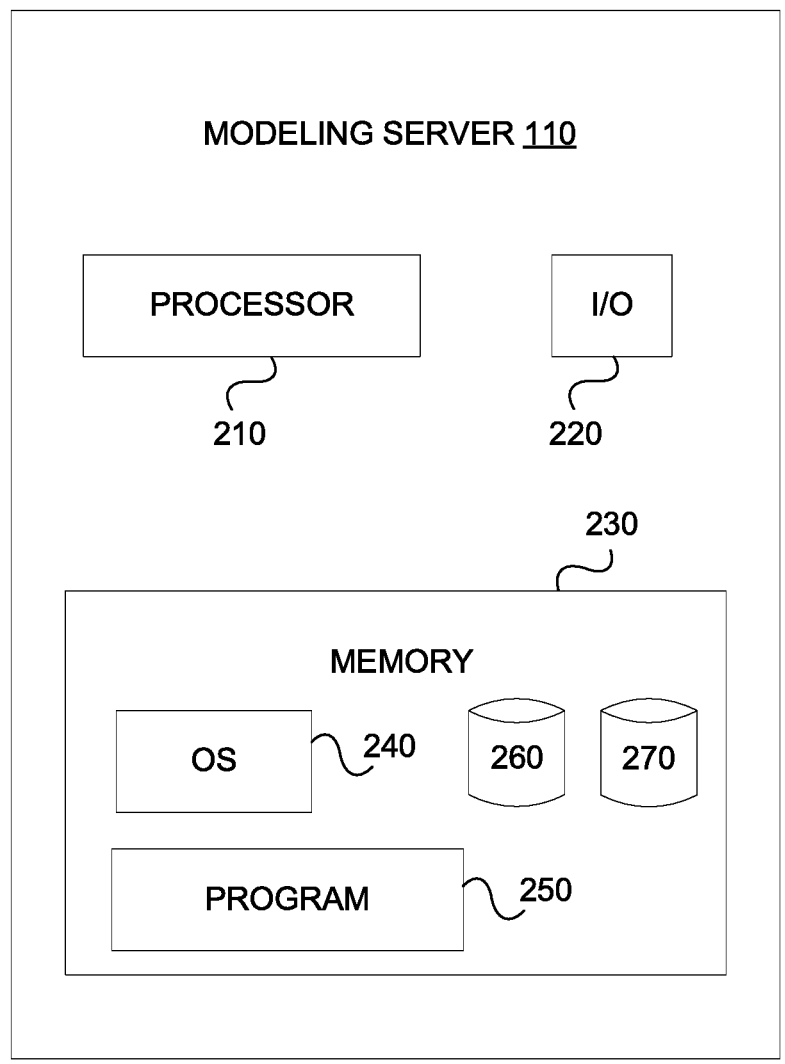
FIG. 2 is a component diagram of a service provider terminal according to an example embodiment.

An example embodiment of modeling server 110 is shown in more detail in FIG. 2. Computing device 120 may have a similar structure and components that are similar to those described with respect to modeling server 110. As shown, modeling server 110 may include a processor 210, an input/output ("I/O") device 220, a memory 230 containing an operating system ("OS") 240 and a program 250. For example, modeling server 110 may be a single server or may be configured as a distributed computer system including multiple servers or computers that interoperate to perform one or more of the processes and functionalities associated with the disclosed embodiments. In some embodiments, modeling server 110 may further include a peripheral interface, a transceiver, a mobile network interface in communication with processor 210, a bus configured to facilitate communication between the various components of the modeling server 110, and a power source configured to power one or more components of modeling server 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, modeling server 110 may configured to remotely communicate with one or more other devices, such as computer device 120. According to some embodiments, modeling server 110 may utilize a dual-stage neural network pipeline to detect and recognize textual information.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Modeling server 110 may include one or more storage devices configured to store information used by processor 210 (or other components) to perform certain functions related to the disclosed embodiments. In one example, modeling server 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, modeling server 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, modeling server 110 may include memory 230 that may include one or more programs 250 to perform one or more functions of the disclosed embodiments. Moreover, processor 210 may execute one or more programs 250 located remotely from modeling server 110. For example, modeling server 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable modeling server 110 to perform one or more of the processes and functionalities associated with the disclosed embodiments.

Modeling server 110 may also be communicatively connected to one or more memory devices (e.g., databases (not shown)) locally or through a network. The remote memory devices may be configured to store information and may be accessed and/or managed by modeling server 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Modeling server 110 may also include one or more I/O devices 220 that may include one or more interfaces for receiving signals or input from devices and providing signals or output to one or more devices that allow data to be received and/or transmitted by modeling server 110. For example, modeling server 110 may include interface components, which may provide interfaces to one or more input devices, such as one or more keyboards, mouse devices, touch screens, track pads, trackballs, scroll wheels, digital cameras, microphones, sensors, and the like, that enable modeling server 110 to receive data from one or more users (such as via computing device 120).

In example embodiments of the disclosed technology, modeling server 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While modeling server 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
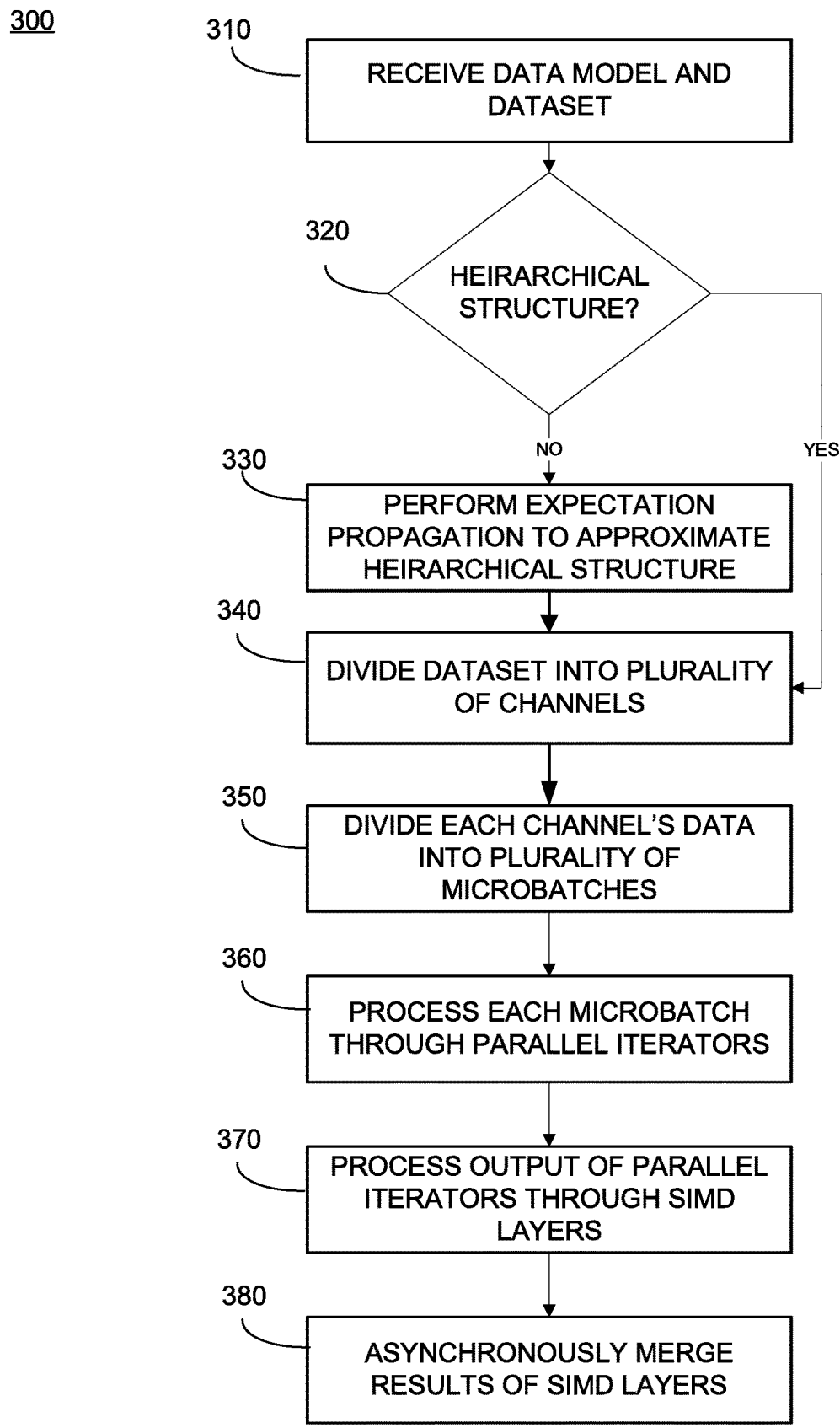
FIGS. 3-5 are flowcharts of one or more methods according to certain example embodiments.

FIG. 3 shows a flowchart of a method 300 for processing data models according to an example embodiment. Method 300 may be performed by, for example, modeling server 110.

Modeling server 110 receives 310 a data model and dataset. For example, modeling server 110 may receive an indication of a data model (e.g., a file or a selected model) from computing device 120. In some cases, modeling server 110 may receive an indication of a location (e.g., a URL) of the dataset from computing device 120, and retrieve the dataset from the identified location. Modeling server 110 determines 320 whether the data model embodies a hierarchical structure (e.g., inherently contains a hierarchical structure). For example, modeling server 110 may analyze a portion of the model specification to determine whether or not the model specification results in the kind of hierarchical structure necessary for massively-parallel analysis. If the data model does not embody the required hierarchical structure (320—NO), modeling server 110 performs 330 expectation propagation to form an approximation of the data model having the required hierarchical structure. Expectation propagation may be based on a statistical analysis of the data structure and the dataset. If the data model embodies the required hierarchical structure with constituent distributions (e.g., sufficiency) (320—Yes), the expectation propagation may be skipped.

Modeling server 110 divides 340 the dataset into a plurality of channels. The dataset may be divided into independent channels. Modeling server 110 further divides 350 the data subset of each channel into a plurality of microbatches. In some cases, the microbatching may be designated based on available computer resources and optimization of parallelism/processing time. One of ordinary skill will recognize, in light of the present disclosure, that batching and/or microbatching provides numerous benefits to the system including, for example, support for parallelization, increased processing time, and greater flexibility in data processing (e.g., by allowing other processes to take place during and after the batching process). For certain data models, however, the data will be batched based on the model parameters and sufficiency statistics. Modeling server 110 then processes 360 each microbatch through one or more parallel iterators. Taking the outputs form the parallel iterators, modeling server 110 further processes the data through single-instruction multiple-data (SIMD) layers. Finally, modeling server 110 asynchronously merges 380 the results of the SIMD layers to create a result for the data model and dataset. As a non-limiting description, each microbatch may be initialized with model parameters (e.g., "population level" information about the other batches), which is summarized into a small amount of auxiliary data. As each microbatch is analyzed, the output of the analysis creates a small set of parameters for that microbatch, which can be quickly communicated back to the central processing layer. These sets of parameters are combined to modify the model parameters towards their true value given the dataset.

In some cases, the data transfer protocols between one or more of the channels to the microbatches, the microbatches to the parallel iterators, the parallel iterators to the SIMD layers, and from the SIMD layers to the final result may be performed using a lossy standard (e.g., a lossy protocol). In the related art, lossy standards are typically avoided, as it may compromise the processes. However, utilizing a stack of microbatches and parallel iterators, the effects of loss of data packets may be minimized. Accordingly, the system may realize gains over relative art systems by ignoring lost packets and reducing latency over lossless standards.

Figure 4:
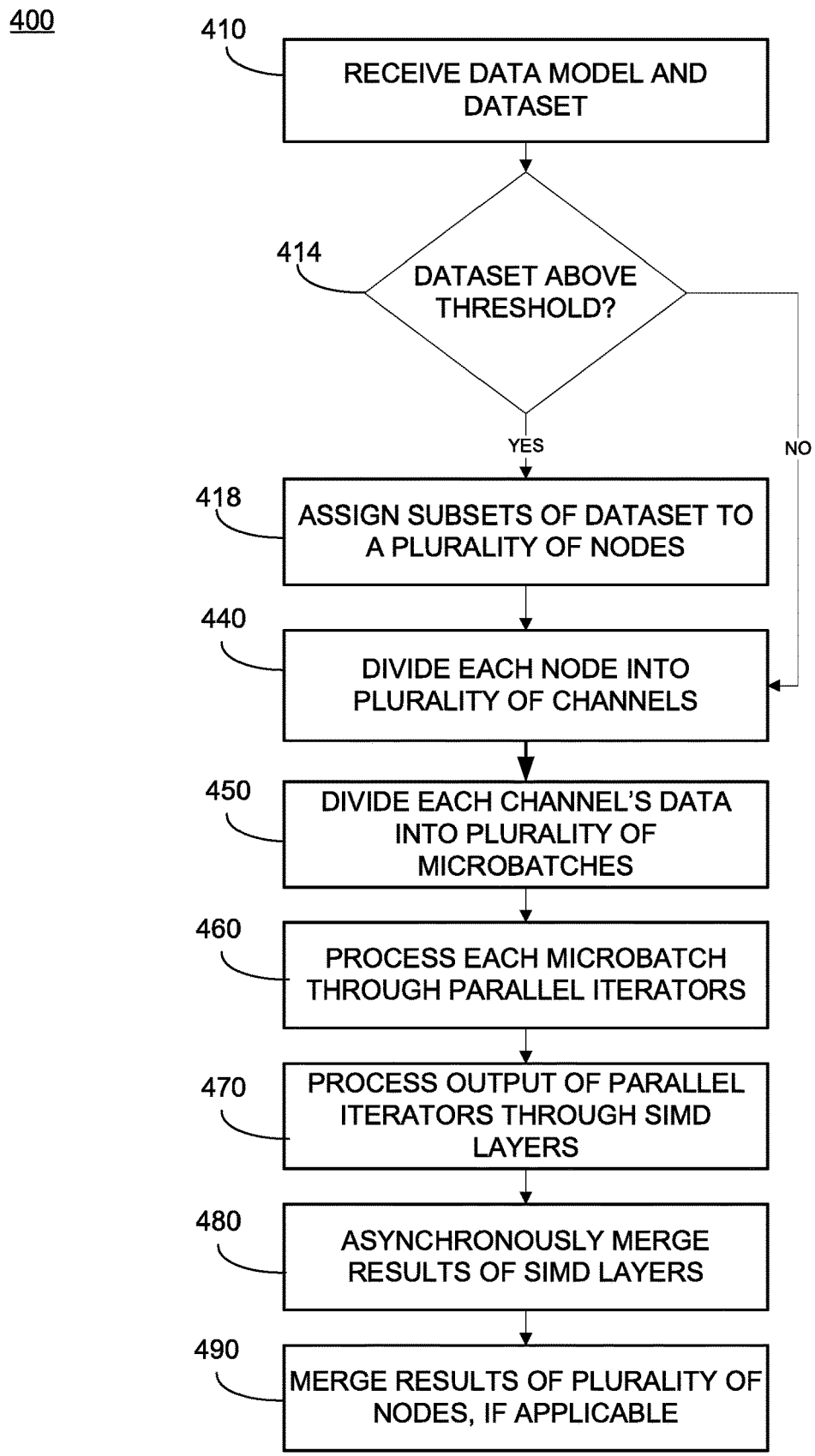

FIG. 4 shows a flowchart of a method 400 for processing data models according to an example embodiment. Method 400 may be performed by, for example, modeling server 110.

Modeling server 110 receives 410 a data model and dataset, for example, similar to that discussed above with reference to FIG. 3 (310). Modeling server 110 analyzes the dataset, and determines 414 whether the dataset has a size above a threshold (e.g., that the dataset is too large to be processed by a single node given the data model). In some cases, the determination 414 may be based on the computational complexity of the calculations being done in the data model along with the amount of data in the dataset. If the dataset is above the threshold (414—YES), modeling server assigned 418 subsets of the dataset to a plurality of nodes. As non-limiting examples, the plurality of nodes may be embodied as separate physical or logical servers.

Modeling server 110 divides 440 each node into a plurality of channels, divides 450 each channel into a plurality of microbatches, processes 460 each microbatch through parallel iterators, processes 470 the output of the parallel iterators through SIMD layers, and asynchronously merges 480 the results of the SIMD layers. In some cases, dividing 440, dividing 450, processing 460, processing 470, and merging 480 may be substantially similar to the corresponding portion of FIG. 3 (340-380). If applicable (i.e., subsets of the dataset were assigned to different nodes), modeling server 110 further merges 490 the results of the plurality of nodes (e.g., from 480). While the local calculations within each node are somewhat model dependent, in some cases, the merging 490 calculations may involve "map-reduce" style aggregations/transformations.

Figure 5:
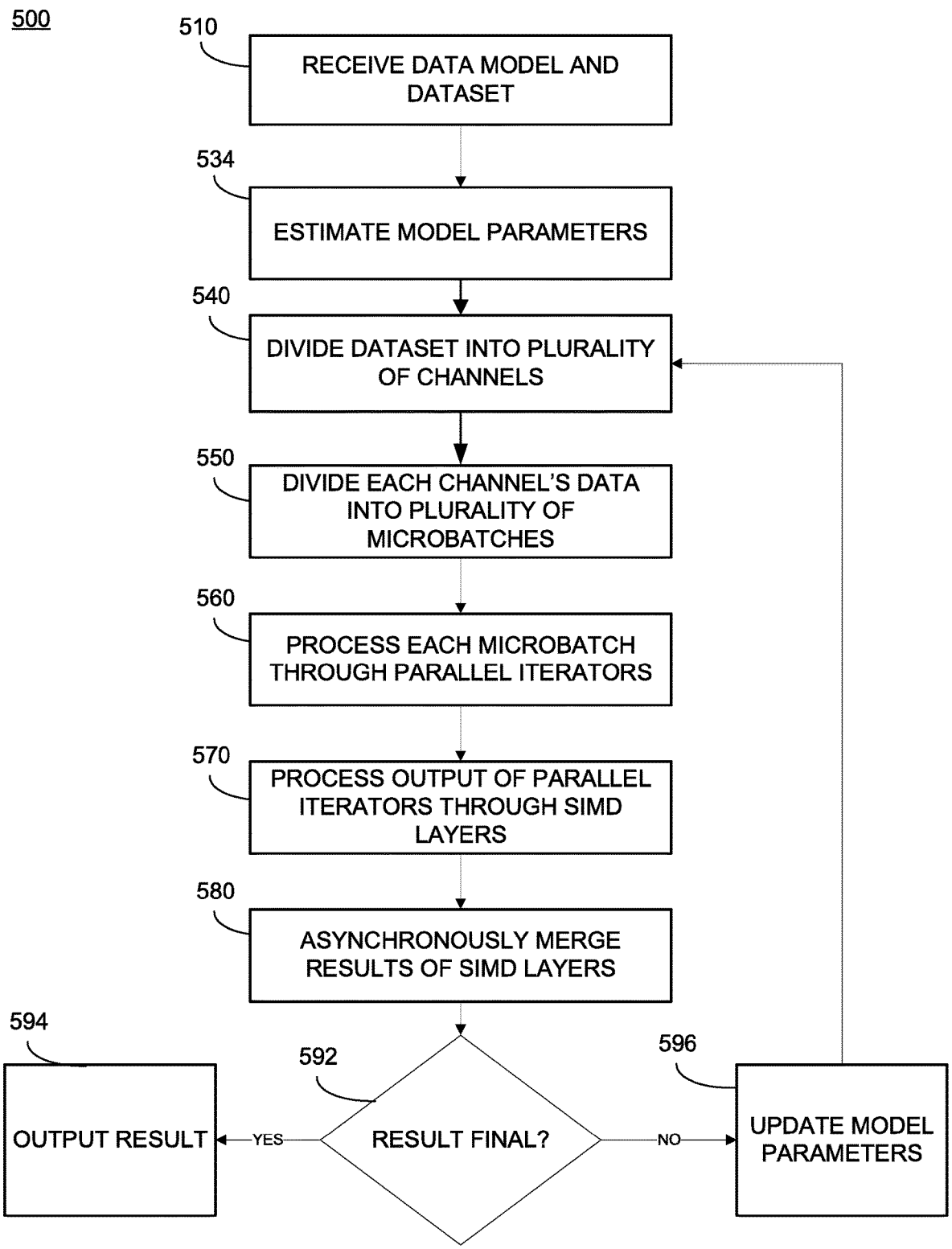

FIG. 5 shows a flowchart of a method 500 for processing data models according to an example embodiment. Method 500 may be performed by, for example, modeling server 110.

Modeling server 110 receives 510 a data model and dataset, for example, similar to that discussed above with reference to FIG. 3 (310). Modeling server 110 analyzes the dataset, and estimates 534 model parameters. Estimating 534 the model parameters may be based on a specific data model, and may include, for example, sampling form a known parameter distribution (e.g., for "conjugate" data models), the use of sub-modules (e.g., targeted to subsets of the data) to estimated individual parameters. In some cases, estimating 534 the model parameters may include assigning default values to the model parameters. The model parameters (as distinct from control parameters) may be shared across all data units, and depend on the dataset only through a small set of sufficient statistics (i.e., aggregations of the data). As would be understood by one of ordinary skill, the sufficient statistics do not typically scale directed with the size of the data, but based on a number of batches and a complexity of the data model. Modeling server 110 divides 540 each node into a plurality of channels, divides 550 each channel into a plurality of microbatches, processes 560 each microbatch through parallel iterators, processes 570 the output of the parallel iterators through SIMD layers, and asynchronously merges 580 the results of the SIMD layers. In some cases, dividing 540, dividing 550, processing 560, processing 570, and merging 580 may be substantially similar to the corresponding portion of FIG. 3 (340-380). One or more of the dividing 540, dividing 550, processing 560, processing 570, and merging 580 may be based on the model parameters (e.g., estimated model parameters). For example, the model parameters of the data model may be used to compute control parameters for each microbatch. Using the control parameters, sufficient statistics of each microbatch may be calculated (e.g., based on the microbatch data), and the combined across the microbatches. In other words, the control parameters that describe each microbatch are independent given the model parameters, and the control parameters may be described using the sufficient statistics for the microbatch.

Modeling server 110 analyzes the asynchronously merged result (580), and determines 592 whether the result is final. If the result is final (592—Yes), modeling server 110 outputs 594 the result. If the result is non-final (592—No), modeling server 110 updates 594 the modeling parameters (e.g., based on the combined sufficient statistics) and again divides 540 the dataset into a plurality of channels. In some instances, the finality of the result may be determined by, for example, assessing whether the overall Markov Chain (for all the model and control parameters) has converged. Once the model parameters have stabilized through the repeated a plurality of microbatching determinations, the model probability distribution can be estimated based on the stabilized model parameters.

One of ordinary skill will recognize, in light of the present disclosure, that the methods described with regards to FIGS. 3-5 may be combined in various ways.

Figure 6:
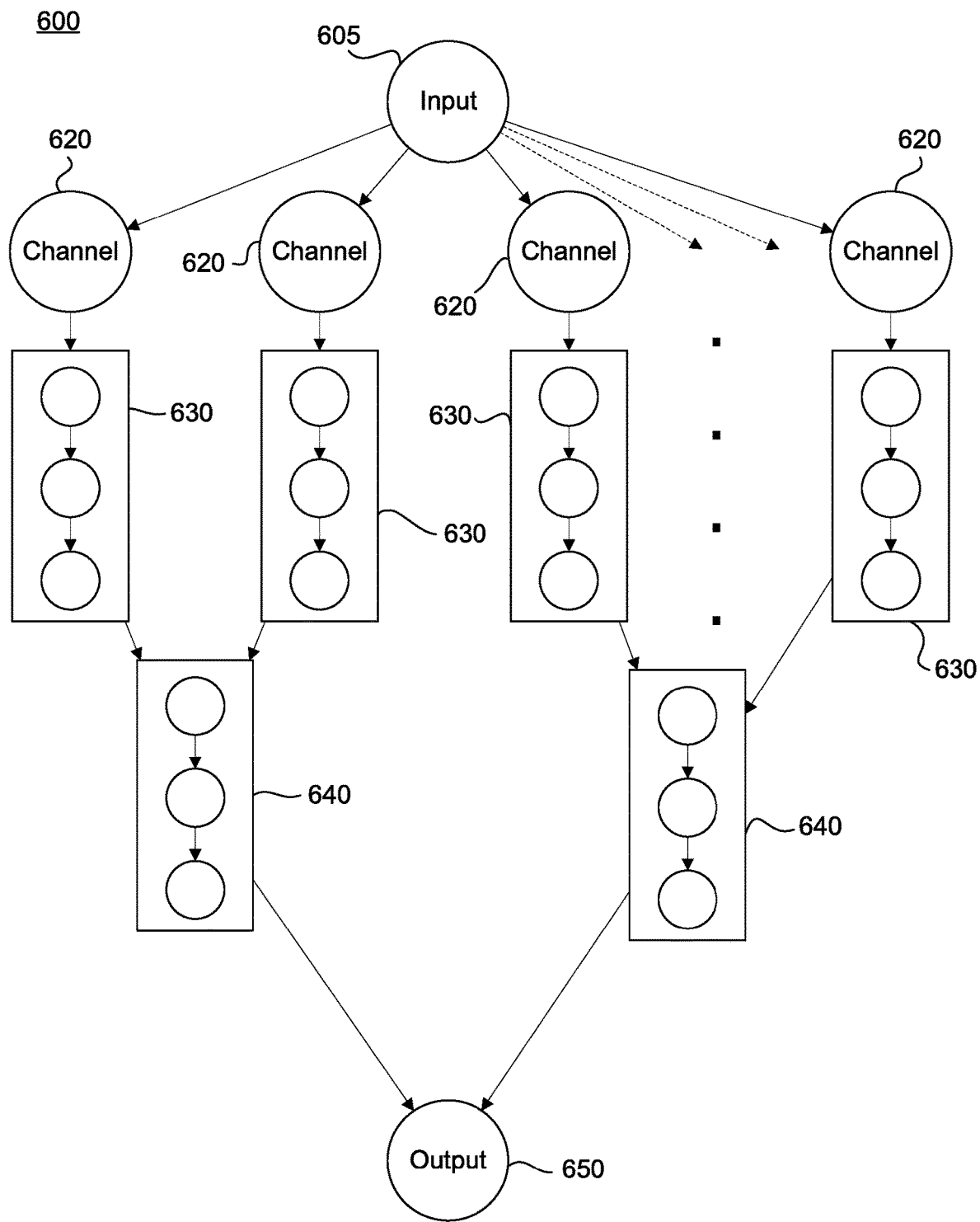
FIGS. 6-8 illustrate processing structures according to some example embodiments.

FIG. 6 illustrates a single-node processing structure according to an example embodiment. Referring to FIG. 6, a dataset is input 605 (e.g., into modeling server 110), and divided into a plurality of channels 620. The data in each channel 620 is further divided into a plurality of microbatches, which are processed by parallel iterators 630, the results of which are processed by SIMD layers 640. The results of the SIMD layers 640 are then merged to create an output 650 of the data model processing.

Figure 7:
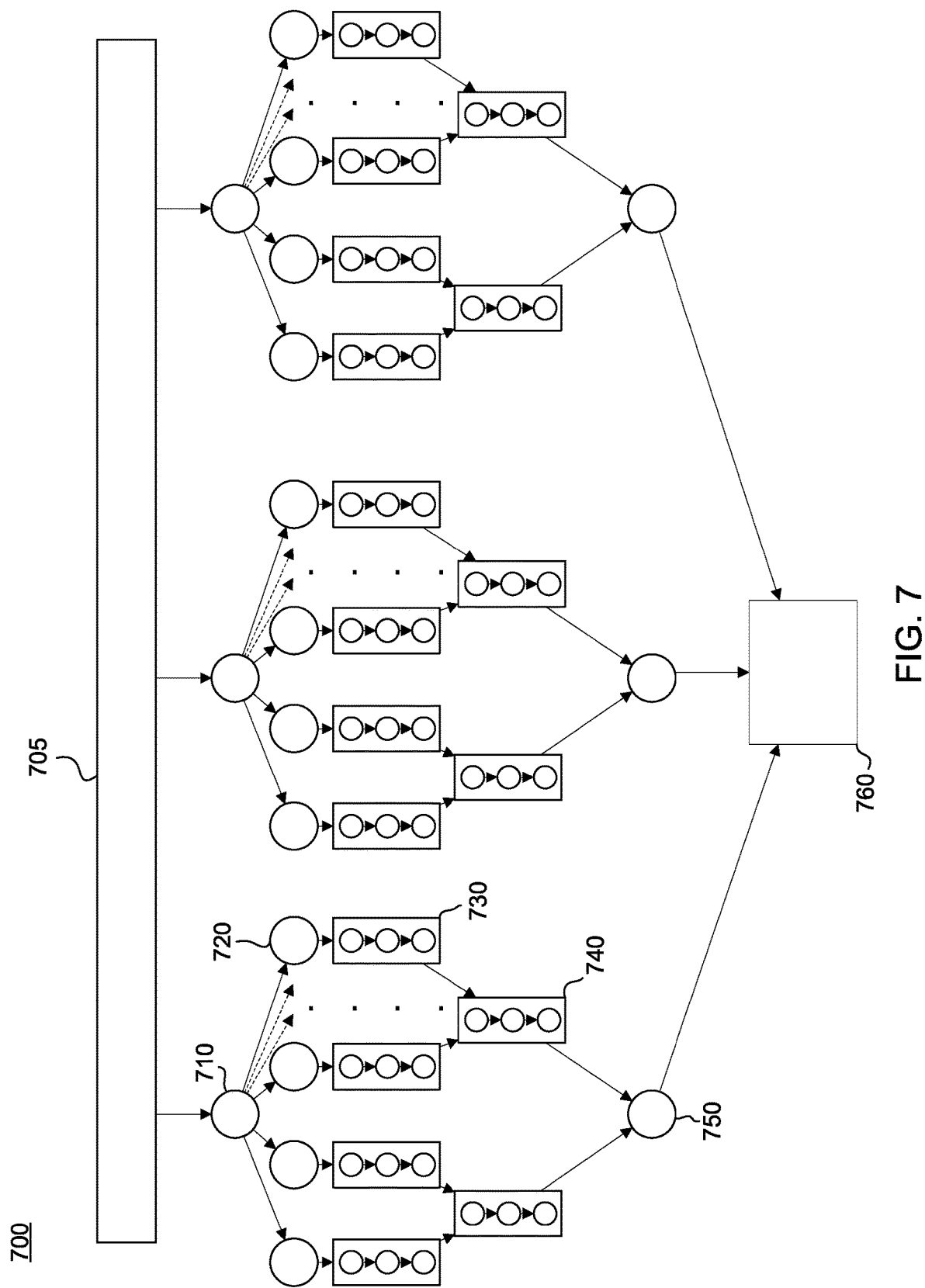
Figure 8:
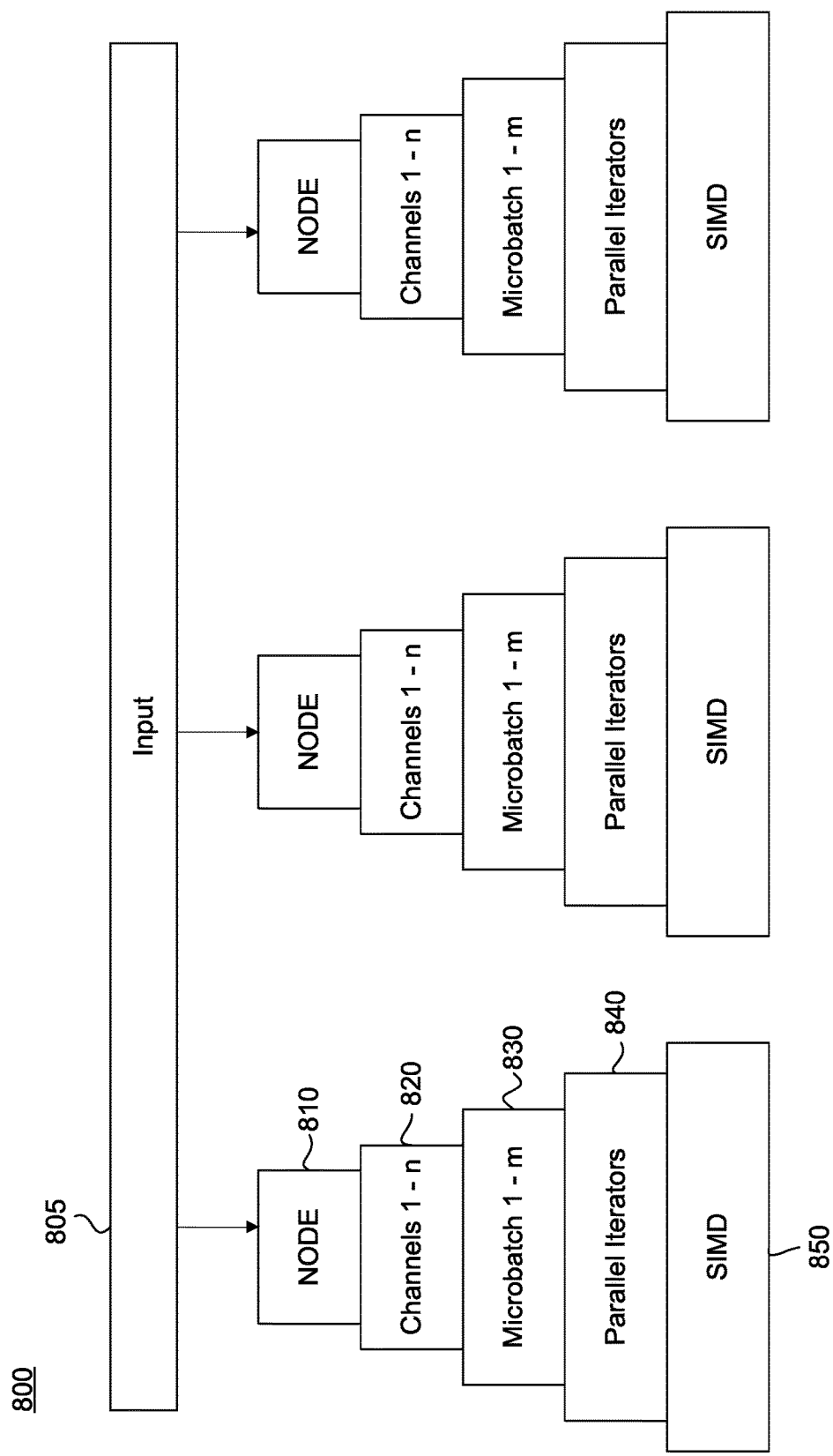

FIGS. 7 and 8 illustrate multi-node processing structures according to example embodiments. Referring to FIG. 7, a dataset is input 705 (e.g., into modeling server 110). If it is determined that the dataset is too large to be processed by a single node, the data is divided and assigned to a plurality of nodes 710. The data in each channel 720 is further divided into a plurality of channels 720 and then microbatches. The data in the microbatches is processed by parallel iterators 730, the results of which are processed by SIMD layers 740. The results of the SIMD layers 740 are then merged to create a node output 750, which are then combined to determine an output 760 of the data model processing. FIG. 8 demonstrates the stacked nature of the data model processing of FIG. 7. In particular, data from an input 805 is divided into nodes 810, subdividing into channels 820, and further subdivided into microbatches 830. The data in the microbatches are processed in parallel iterators 840, which are further processed by SIMD layers 850.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASE

The following example use case describes an example of a use of systems and methods for processing large data models utilizing parallel and distributed processing. It is intended solely for explanatory purposes and not in limitation. In one case, a company wishes to train a data model using a large dataset. Traditionally, the company would have to hire experts in data processing, who would then run the training utilizing heavily serial processing. As such, the time and monetary costs to train the data model may be very high. However, utilizing certain aspects of the present disclosure, the company provides the data model and dataset to a modeling server (e.g., modeling server 110), which divides the dataset into microbatches, and processes the microbatches in parallel. These microbatches are processed using parallel iterators and SIMD layers, the results of which may be combined to tune the model.

In some cases, the data processing may be iterative, in that sufficient statistics calculated from processing microbatches are combined to update model parameters, and the processing is repeated with the updated model parameters. In some situations, the modeling server may determine whether the data model has an inherently hierarchical structure, and, if not, the modeling server may perform expectation propagation to create a hierarchical approximation of the data model.

What is claimed is:

1. A system comprising:
   at least one hardware processor; and
   at least one hardware memory having stored thereon computer program code that, when executed by the at least one processor, controls the system to:
   receive a data model identification and a dataset of a data model;
   assign subsets of the dataset to respective nodes of a plurality of nodes, each of the plurality of nodes comprising a respective hardware processor;
   for each of the plurality of nodes:
   divide the data subset into a plurality of channels, each of the plurality of channels comprising a separate logical division of the data; and
   for each of the plurality of channels:
   further divide the data subset into a plurality of microbatches, a number of the plurality of microbatches and a size of the plurality of microbatches being based on model parameters and sufficiency statistics;
   process each microbatch of the plurality of microbatches through parallel iterators;
   transmit, amongst the plurality of microbatches corresponding to the node, respective microbatch states using a lossy transfer protocol capable of dropping packets; and
   process outputs of the parallel iterators through single-instruction multiple-data (SIMD) layers;
   asynchronously merge results of the SIMD layers using a lossy transfer protocol capable of dropping packets; and
   merge results for the plurality of nodes.

2. The system of claim 1, wherein each node identifies the assigned subset of data based on a master configuration, and directly accesses the assigned subset of data.

3. The system of claim 2, wherein the nodes of the plurality of nodes do not pass data between themselves.

4. The system of claim 1, wherein the computer program code, when executed by the at least one processor, further controls the system to:
   update, based on the merged results of the plurality of nodes, model parameters of the data model; and
   repeat, for each of the plurality of nodes and for each of the plurality of channels and based on the updated model parameters, dividing the data subset into a plurality of microbatches, processing each microbatch through parallel iterators, and processing the output of the parallel iterators through respective SIMD layers.

5. The system of claim 1, wherein the data model comprises a Bayesian data model.

6. A method comprising:
   receiving a data model identification and a dataset of a data model;
   assigning subsets of the dataset to respective nodes of a plurality of nodes, each of the plurality of nodes comprising a respective hardware processor;
   for each of the plurality of nodes:
   dividing the data subset into a plurality of channels, each of the plurality of channels comprising a separate logical division of the data; and
   for each of the plurality of channels:
   further dividing the data subset into a plurality of microbatches, a number of the plurality of microbatches and a size of the plurality of microbatches being based on model parameters and sufficiency statistics;
   processing each microbatch of the plurality of microbatches through parallel iterators;
   transmitting, amongst the plurality of microbatches corresponding to the node, respective microbatch states using a lossy transfer protocol capable of dropping packets; and
   processing outputs of the parallel iterators through single-instruction multiple-data (SIMD) layers;
   asynchronously merging results of the SIMD layers using a lossy transfer protocol capable of dropping packets; and
   merging results for the plurality of nodes.

7. The method of claim 6, wherein each node identifies the assigned subset of data based on a master configuration, and directly accesses the assigned subset of data.

8. The method of claim 7, wherein the nodes of the plurality of nodes do not pass data between themselves.

9. The method of claim 6 further comprising:
updating, based on the merged results of the plurality of nodes, model parameters of the data model; and
repeating, for each of the plurality of nodes and for each of the plurality of channels and based on the updated model parameters, dividing the data subset into a plurality of microbatches, processing each microbatch through parallel iterators, and processing the output of the parallel iterators through respective SIMD layers.

10. The method of claim 6, wherein the data model comprises a Bayesian data model.

11. A non-transitory computer-readable medium having stored thereon instructions for executing a method comprising:
receiving a data model identification and a dataset of a data model;
assigning subsets of the dataset to respective nodes of a plurality of nodes, each of the plurality of nodes comprising a respective hardware processor;
for each of the plurality of nodes:
dividing the data subset into a plurality of channels, each of the plurality of channels comprising a separate logical division of the data; and
for each of the plurality of channels:
further dividing the data subset into a plurality of microbatches, a number of the plurality of microbatches and a size of the plurality of microbatches being based on model parameters and sufficiency statistics;
processing each microbatch of the plurality of microbatches through parallel iterators;
transmitting, amongst the plurality of microbatches corresponding to the node, respective microbatch states using a lossy transfer protocol capable of dropping packets; and
processing outputs of the parallel iterators through single-instruction multiple-data (SIMD) layers;
asynchronously merging results of the SIMD layers using a lossy transfer protocol capable of dropping packets; and
merging results for the plurality of nodes.

12. The non-transitory computer-readable medium of claim 11, wherein each node identifies the assigned subset of data based on a master configuration, and directly accesses the assigned subset of data.

13. The non-transitory computer-readable medium of claim 12, wherein the nodes of the plurality of nodes do not pass data between themselves.

14. The non-transitory computer-readable medium of claim 11, wherein the method further comprises:
updating, based on the merged results of the plurality of nodes, model parameters of the data model; and
repeating, for each of the plurality of nodes and for each of the plurality of channels and based on the updated model parameters, dividing the data subset into a plurality of microbatches, processing each microbatch through parallel iterators, and processing the output of the parallel iterators through respective SIMD layers.

15. The non-transitory computer-readable medium of claim 11, wherein the data model comprises a Bayesian data model.

* * * * *